Figure 1:
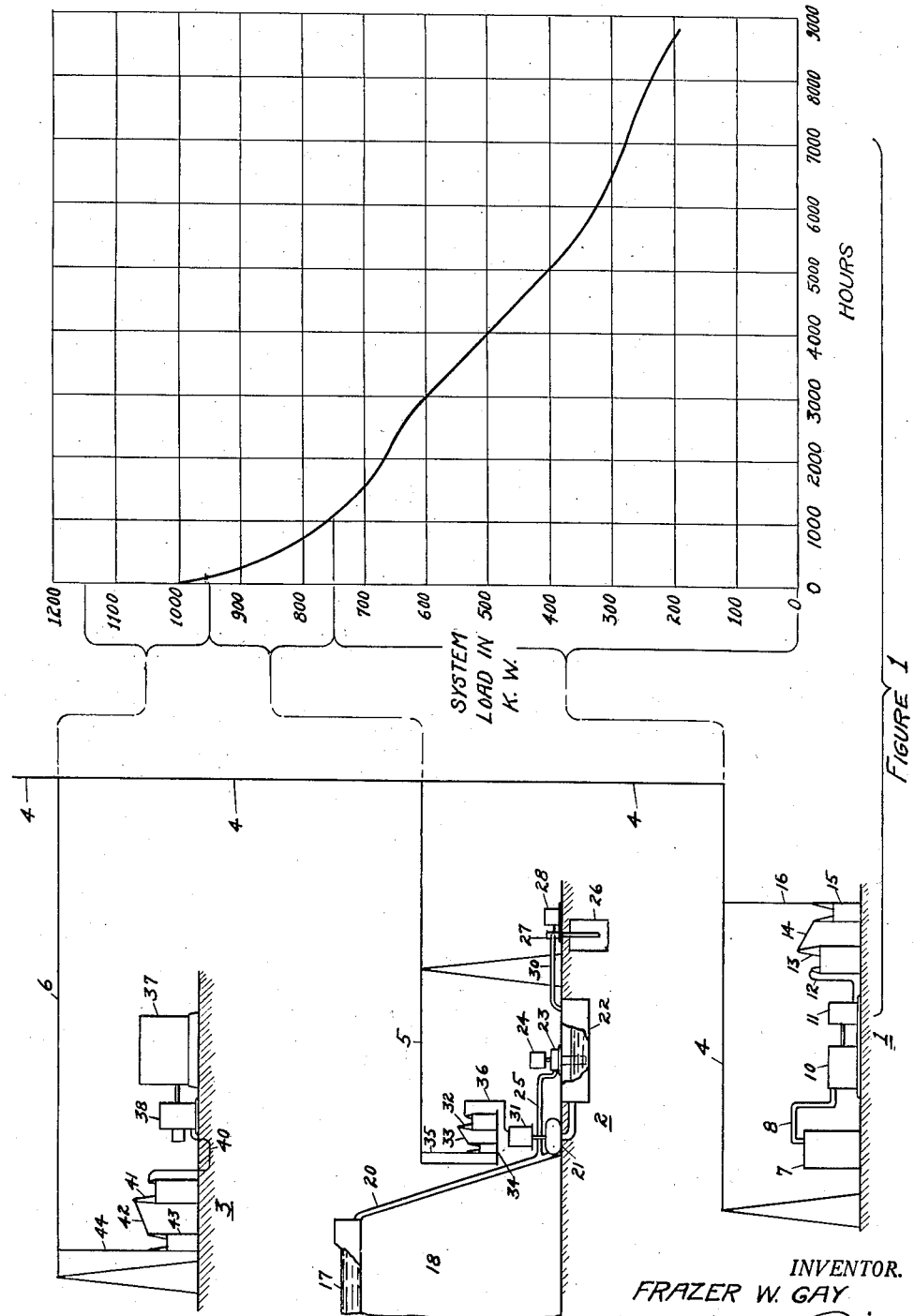

April 23, 1929.　　　　F. W. GAY　　　　1,709,846

METHOD FOR LOAD DIVISION IN ELECTRIC POWER GENERATION

Filed May 31, 1928　　　2 Sheets-Sheet 1

INVENTOR.
FRAZER W. GAY
BY George D. Richard
ATTORNEY

April 23, 1929. F. W. GAY 1,709,846
METHOD FOR LOAD DIVISION IN ELECTRIC POWER GENERATION
Filed May 31, 1928 2 Sheets-Sheet 2

INVENTOR.
FRAZER W. GAY
BY George D. Richards
ATTORNEY.

Patented Apr. 23, 1929.

1,709,846

UNITED STATES PATENT OFFICE.

FRAZER W. GAY, OF NEWARK, NEW JERSEY.

METHOD FOR LOAD DIVISION IN ELECTRIC-POWER GENERATION.

Application filed May 31, 1928. Serial No. 281,719.

This invention relates to electric power generation, and particularly to the method of dividing the load carried by a generating system among a plurality of diversified generating means.

It has been the practice of power companies in the past few years in building new power plants to install large turbo-generators adapted to run continuously for weeks or months at a time. These machines are highly efficient when run continuously in this manner, but difficulty has been experienced in using them for carrying peak loads which require repeated stopping and starting. In order that these machines may carry peak loads, which are loads of temporary duration, it is necessary that they be continuously idled or retained in a warmed condition so as to enable them to be put into operation on comparatively short notice, but even so they are never immediately available and a very appreciable lapse of time is required before full generating effieciency thereof can be obtained. Large quantities of steam are consumed in retaining these machines in condition for operation on comparatively short notice, which results in expensive and non-productive operating charges.

The principal object of this invention is to provide generating means in combination with and auxiliary to a steam generating plant, which may be readily started and stopped on substantially a moments notice, for the purpose of carrying the excess portions of the load of a steam generating plant that is of temporary duration.

More particularly this invention utilizes hydro-electric generating units and internal combustion generating units in combination with the main steam generating plant for the purpose of carrying this temporary load.

In a hydro-electric power station, the water turbines may be readily and quickly started and stopped and therefore are adapted to substantially immediately drive generators at operative speed to carry temporary loads, as well as more or less constant loads. The operating efficiency of a hydro-electric power station is ordinarily high, but this advantage of the hydro-electric station is offset to a large extent by the expense of the large capital investment necessary for constructing this type of power station. For example, in the development of this type of station, a reservoir must be constructed across a river carrying water and the construction operations generally have to be carried on through flood periods. The dam must be made strong enough to withstand flood conditions, thereby requiring a much larger factor of safety than would be necessary were the water retained not subject to extensive variations in head. Also, the head to be developed is fixed by nature and is usually such as to require hydraulic machinery of the more expensive type.

The hydro-electric generating station of this invention utilizes a high level reservoir that may be conveniently located at a suitable height in any one of a plurality of places, such as upon a mountain. Water from the high level reservoir is adapted to flow through and operate the water turbines and then flows into a low level reservoir, which may or may not have a natural source of water supply. Motor driven pumps, that are operated by turbo generators, are utilized to pump the water from the low level reservoir back into the high level reservoir for further use. "Make up water", or water used for augmenting the water in the high level reservoir so as to provide for evaporation, see page, etc., may be supplied by suitable wells or from any other water source.

In a power station using internal combustion engines, the capital investment is low and these prime movers may be readily and quickly started and stopped as for the purpose of carrying temporary peak loads. The operating expenses of such station when used alone, however, are comparatively high, rendering such apparatus unfit for the carrying of large relatively continuous loads.

According to this invention the hydro-electric or internal combustion power operated types of plants or both are employed as complements to a main steam turbine type power plant in such manner that the relatively constant load on a power distributing system may be continuously carried by the latter while the temporary or peak loads are provided for by either one or both of the former types of plants; all to the end that generating units may be quickly available on the most economical basis, and capital and operating costs of the main steam turbine type plant reduced to a minimum.

Another object of this invention is to provide a novel construction and arrangement of hydro-electric generating plant especially suitable for use as a complement of a main steam turbine type generating plant.

Other objects and advantages will become apparent from the specification, taken in connection with the accompanying drawings wherein the invention is embodied in concrete form.

In the drawings:—

Figure 2:
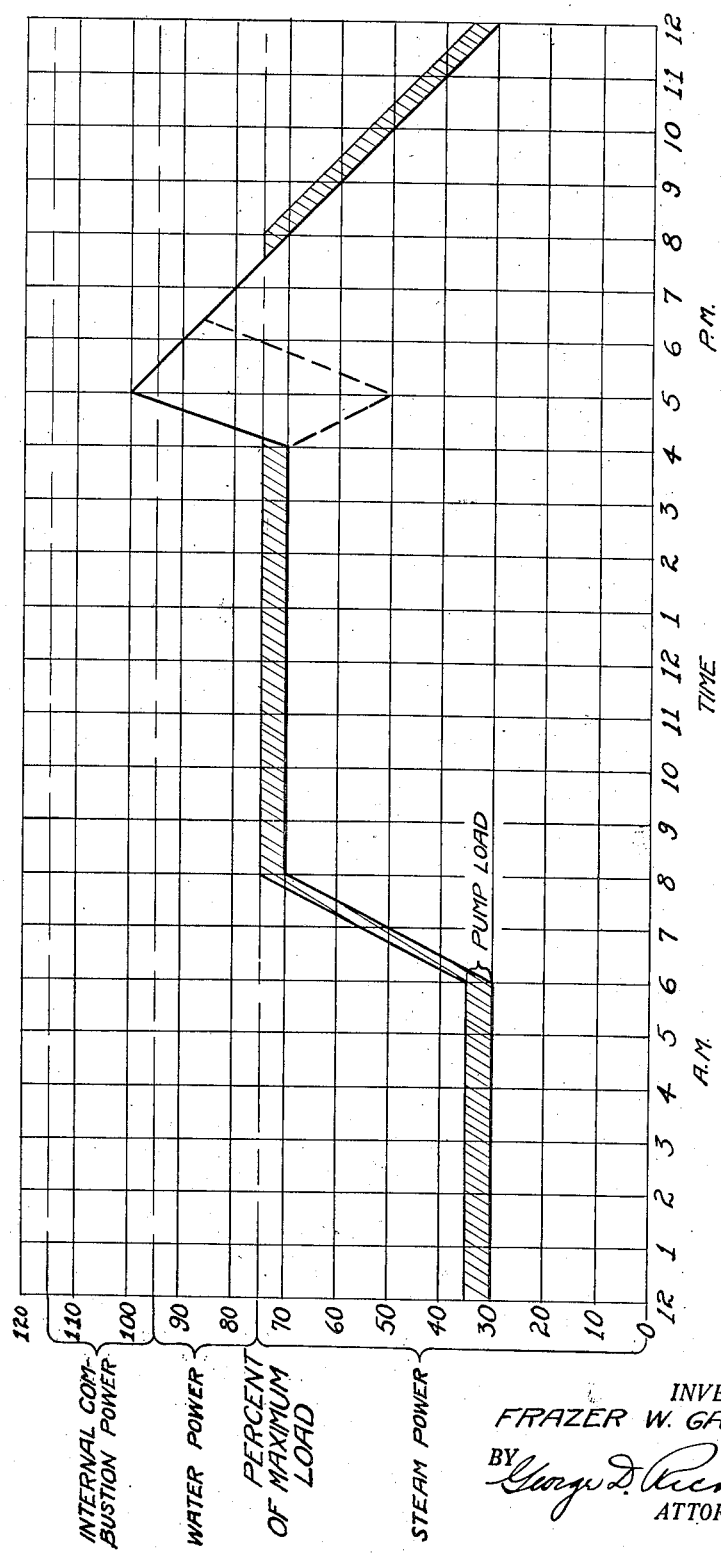

Figure 1 is a diagrammatic representation of the power generating system of this invention and of the load carried by this system during the year, as well as that carried by the component parts thereof; and Figure 2 is a diagrammatic representation of the load carried by the power generating system and the manner of distributing the load among the several component parts of the total generating apparatus during a day of worst load condition.

Referring to Figure 1 of the drawings, the reference numeral 1 designates a steam power generating plant as a whole, which is adapted to supply current to the power line 4. A water power generating plant, designated as a whole by the reference numeral 2, is adapted to supply current to the transmission line 5, that is connected to the power line 4. The reference numeral 3 designates an internal combustion engine power plant which supplies current to the transmission line 6, that is also connected to the power line 4.

The steam power generating plant 1 consists of one or more units comprising, a boiler 7 arranged to supply steam through piping 8 to a turbine 10 that drives a generator 11. Generator 11 has its leads 12 connected directly to the primary of the transformer bank 13. The secondary of the transformer bank 13 is connected by leads 14 to a circuit breaker 15, which in turn is connected by leads 16 to the power line 4.

In the water power generating plant 2, an elevated reservoir 17 is provided in any convenient location, such as upon a mountain 18. As will be described later, the reservoir 17 is adapted to be supplied with the water that is pumped from near by wells or from a river, or other natural body or source of water. A flume 20 conveys water from reservoir 17 to a water turbine 21. Water turbine 21 exhausts its water into a low level reservoir 22. The reservoir 22 may have a natural source of water supply such as a river flowing into this reservoir at one end and out at the other end. A pump 23, driven by a motor 24, is adapted to convey water from the low level reservoir 22 through piping 25 to the flume 20 and from thence back into the reservoir 17, thereby acting to maintain the desired head of water in reservoir 17. A well 26 is illustrated as a source of water for augmenting the supply of water to the low level reservoir 22. A pump 27 is driven by a motor 28 and is adapted to pump water from the well 26 through piping 30 into the low level reservoir 22. In the event that the reservoir 22 does not have a natural water supply, all of its water including that furnished to the reservoir 17, is derived from the well 26.

Inasmuch as the site of the reservoir 17 may be chosen from a plurality of suitable sites in a given section of territory, there being no necessity for a natural flow of water, the most economical site giving the most suitable head may be chosen, thereby enabling the cost of the hydro-electric operating equipment as well as the cost of dams and other equipment to be reduced to a minimum. It is not necessary to choose any particular site regardless of construction costs, as is usually the case with a hydro-electric plant situated on a river and deriving its water supply therefrom. Thus, by using the hydro-electric installation of this invention the initial plant cost is reduced to a nominal figure, thereby lowering the operating expenses.

Water turbine 21 drives a generator 31. Generator 31 has its leads 36 connected to the primary of the transformer bank 32. The secondary of the transformer bank 32 is connected by leads 33 to a circuit breaker 34. Circuit breaker 34 is connected by leads 35 to the transmission line 5.

The internal combustion engine generating plant 3 consists of one or more units comprising, an internal combustion engine 37 arranged to drive a generator 38. Generator 38 has its leads 40 connected directly to the primary of the transformer bank 41. The secondary of the transformer bank 41 is connected by leads 42 to a circuit breaker 43, which in turn is connected by leads 44 to the transmission line 6.

In operation, the steam power generating plant 1 is adapted to furnish electrical energy continuously at a substantially constant rate to the power line 4. The electric energy thus supplied is sufficient to carry the portion of the total load of the generating system that is substantially constant. Since the plant 1 operates continuously, there are no idling turbines which would consume large quantities of steam and therefore, this plant has an extremely high operating efficiency. It has been found in actual practice that plant 1, when thus operated in a substantially continuous manner, can produce electrical energy at a cost of substantially three mills per kilowatt hour.

In the graph shown in Figure 1, the total load of a typical generating system, expressed in thousands of kilowatts, is plotted as ordinates and the time during a typical year, expressed in hours, is plotted as abscissæ. The graph thus affords a means for determining the total number of hours of plant operation during the year at any given load. The graph starts with a day of worst load condition occurring in December, at which time the maximum total load is shown as 1000 units, which is equivalent to $1000 \times 10^3$ K. W. The steam plant 1 is adapted to carry the substantially continuous portion of this maximum total load. In Figure 1 the steam plant 1 is illustrated as carrying (750) units of the maximum total load or seventy five per cent thereof.

The water power generating plant 2, since it is adaptable for use to the extent of its full capacity upon a moment's notice, is normally held in reserve and is used for carrying the peak loads or a portion thereof. It supplies current to the transmission line 5 that is connected to the power line 4. In the graph of Figure 1, this plant is illustrated as carrying that portion of the peak load extending between 750 and 950 units consisting of 200 units in all. In practice this plant can produce electrical energy at an operating cost of five mills per kilowatt hour exclusive of capital expense.

The internal combustion engine generating plant 3 is also held in reserve for use in carrying a portion of the heaviest peak loads. It can be set into operation upon short notice and supplies current to the transmission line 6 that is connected to the power line 4. In the graph of Figure 1, this plant is illustrated as having a capacity for carrying a portion of the load extending between 950 and 1115 units, or 200 units, although it is ordinarily called upon to supply only a portion of this amount of load. In practice this plant can produce electrical energy at an operative cost of thirty mills per kilowatt hour, exclusive of capital expense.

It will be apparent that by the method of operating the hydro-electric and internal combustion power type plants as complements of a steam power generating plant, that the combined operating cost may be considerably reduced over the cost of operating a steam power generating plant alone to yield equivalent maximum power output. In addition to the saving in operating thus involved, it will be obvious that capital costs when allocated over the several types of plants will also be greatly reduced as compared with the capital charges which must be calculated with respect to a steam power plant adapted to yield equivalent maximum power output.

In the graph shown in Fig. 2, the portions of the total load of the generating system carried by the plants 1, 2 and 3, expressed in per cent, is plotted as ordinates and the time during the day, expressed in hours, is plotted as abscissæ. The solid black line of the graph illustrates the load time relation on a day of worst load condition occurring in December, whereas the broken line illustrates this relation on a normal day.

It will be seen from an inspection of Fig. 2 that the steam plant 1 carries the substantially constant and major portion of the system load, including that necessary to operate the pumps 23 and 27 of the hydro-electric plant 2, indicated by the shaded area. These pumps in an ordinary installation will consume substantially five percent of the maximum load and are operated during that portion of the day when the load is sub-normal or normal. They are not operated during peak periods.

It will be noted that since the steam plant 1 operates at a high efficiency and carries the greater portion of the total load and that as the hydro-electric plant 2 is called upon only at peak load periods and also operates at a high efficiency, that the total over all efficiency of the generating system is extremely high. The internal combustion engine plant is called upon only for the tops of the peak loads and then only during a relatively short period of the year.

The hydro-electric installation is substantially a closed system since the water from the reservoir 17 after operating the turbines 21 is again returned to the reservoir 17 to be used over and over again, therefore attaining the greatest possible economy in the use of water. Only sufficient water has to be added from time to time to this system to provide for evaporation, seepage, etc. If the water supplied to the reservoir 17 is salt, as in the case of sea water, there is the additional advantage of reducing the possibility of freezing of the water during the winter period. Also the using of the same water over and over again eliminates the expense of removing drift wood and trash from the water before it enters the turbines which is a constant source of difficulty in ordinary hydraulic installations.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. The method of operating a power plant comprising a high efficiency steam turbo-generator plant and a high efficiency hydro-electric installation including a high level reservoir, a low level reservoir, and a pump, which consists in operating the steam turbo-generator plant to carry that portion of the maximum load which is in demand substantially continuously, and to drive said pump to elevate water from said low level reservoir to said high level reservoir, and in utilizing the elevated water to operate said hydro-electric installation to carry the remaining portion of the maximum load.

2. The method of operating a power plant comprising; a high efficiency steam turbo-generator plant; a high efficiency hydro-electric installation including a high reservoir, a low level reservoir, and a pump; and an internal combustion engine generating plant; which method consists in operating the steam turbo-generator plant to carry that portion of the maximum load which is in demand substantially continuously, and to drive said pump to elevate water from said low level reservoir to said high level reservoir, in utilizing the elevated water to operate said hydro-electric installation to carry a portion of the maximum load which is in demand part of the time, and in operating the internal combustion engine generating plant to carry another portion of the maximum load which is in demand part of the time.

3. The method of operating a power plant comprising; a high efficiency steam turbo-generator plant; a high efficiency hydro-electric installation including a pump, a high level reservoir and a low level reservoir constituting a closed system, and an internal combustion engine generating plant; which method consists in operating the steam turbo-generator plant to carry that portion of the maximum load which is in demand for the longest time duration, and to drive said pump to elevate water from said low level reservoir to said high level reservoir, in utilizing the elevated water to operate said hydro-electric installation to carry that portion of the maximum load which is in demand for a considerable time duration, and in operating the internal combustion engine generating plant to carry the remaining portion of the maximum load.

In testimony that I claim the invention set forth above I have hereunto set my hand this 28th day of May, 1928.

FRAZER W. GAY.